US009672977B2

(12) United States Patent
Van Goor et al.

(10) Patent No.: US 9,672,977 B2
(45) Date of Patent: Jun. 6, 2017

(54) TRANSPARENT CAPACITIVE WIRELESS POWERING SYSTEM

(75) Inventors: Dave Willem Van Goor, Nederweert eind (NL); Adrianus Sempel, Waalre (NL); Henricus Theodorus Van Der Zanden, Sint-Oedenrode (NL); Eberhard Waffenschmidt, Aachen (DE); Theodorus Johannes Petrus Van Den Biggelaar, Veldhoven (NL); Oscar Hendrikus Willemsen, Den Bosch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 525 days.

(21) Appl. No.: 14/238,287

(22) PCT Filed: Aug. 9, 2012

(86) PCT No.: PCT/IB2012/054062
§ 371 (c)(1),
(2), (4) Date: Feb. 11, 2014

(87) PCT Pub. No.: WO2013/024406
PCT Pub. Date: Feb. 21, 2013

(65) Prior Publication Data
US 2014/0191587 A1    Jul. 10, 2014

Related U.S. Application Data

(60) Provisional application No. 61/622,106, filed on Apr. 10, 2012, provisional application No. 61/523,925, (Continued)

(51) Int. Cl.
*H02J 50/05*    (2016.01)
*H01F 38/14*    (2006.01)
(Continued)

(52) U.S. Cl.
CPC .............. *H01F 38/14* (2013.01); *H02J 7/025* (2013.01); *H02J 50/05* (2016.02); *H04B 5/0012* (2013.01);
(Continued)

(58) Field of Classification Search
CPC ........................... H04B 5/0012; H02J 50/05
See application file for complete search history.

(56) References Cited

U.S. PATENT DOCUMENTS 7,604,757 B2     10/2009  Yasuda
2003/0233288 A1*  12/2003  Sweeney .............. G06Q 10/087
                                                       705/28
(Continued)

FOREIGN PATENT DOCUMENTS

JP         9-312942 A      12/1997
JP       2005175120 A       6/2005
(Continued)

OTHER PUBLICATIONS

"Disclosure Electronics in Glass", RD 477007, Jan. 2004, Kenneth Mason Publications LTD, pp. 1-5.
(Continued)

*Primary Examiner* — Rexford Barnie
*Assistant Examiner* — David Shiao

(57) ABSTRACT

A transparent capacitive powering system (200) is disclosed. The system comprises a pair of receiver electrodes (241, 242) connected to a load (250) through an inductor (260), wherein the inductor is coupled to the load to resonate the system; and a transparent infrastructure (220) having at least a first layer (130) of a non-conductive transparent material and a second layer (120) of a conductive transparent material coupled to each other, wherein the second layer is arranged to form a pair of transmitter electrodes (221, 222), wherein the pair of receiver electrodes are decoupled from
(Continued)

the second layer, thereby forming a capacitive impedance between the pair of transmitter electrodes and the pair of receiver electrodes, wherein a power signal generated by a driver (210) is wirelessly transferred from the pair of transmitter electrodes to the pair of receiver electrodes to power the load when a frequency of the power signal substantially matches a series-resonance frequency of the first inductor and the capacitive impedance.

15 Claims, 8 Drawing Sheets

Related U.S. Application Data filed on Aug. 16, 2011, provisional application No. 61/523,951, filed on Aug. 16, 2011.

(51) Int. Cl.
  *H04B 5/00* (2006.01)
  *H02J 7/02* (2016.01)
  *H05B 33/08* (2006.01)

(52) U.S. Cl.
  CPC ....... *H04B 5/0037* (2013.01); *H05B 33/0815* (2013.01)

(56) References Cited

U.S. PATENT DOCUMENTS

| | | | |
|---|---|---|---|
| 2006/0281406 A1* | 12/2006 | Ishibashi | H04B 13/005 455/41.1 |
| 2007/0258270 A1 | 11/2007 | Scheiman | |
| 2009/0072782 A1* | 3/2009 | Randall | G06F 1/1616 320/107 |
| 2009/0159677 A1* | 6/2009 | Yakimov | H05B 33/0896 235/439 |
| 2009/0290332 A1* | 11/2009 | Jacobs | F21V 23/02 362/183 |
| 2009/0302690 A1* | 12/2009 | Kubono | H02J 17/00 307/109 |
| 2010/0003511 A1 | 1/2010 | So | |
| 2010/0060077 A1* | 3/2010 | Paulus | B32B 17/10036 307/10.1 |
| 2010/0087143 A1* | 4/2010 | Bonin | H02J 5/00 455/41.1 |
| 2011/0151780 A1* | 6/2011 | Hood, III | H01Q 1/24 455/41.1 |
| 2011/0316353 A1* | 12/2011 | Ichikawa | H02J 7/0044 307/149 |
| 2012/0038223 A1* | 2/2012 | Harakawa | H01F 38/14 307/109 |
| 2012/0062174 A1* | 3/2012 | Kamata | H02J 7/025 320/108 |
| 2012/0286680 A1* | 11/2012 | Roberts | H05B 33/0809 315/200 R |

FOREIGN PATENT DOCUMENTS

| | | |
|---|---|---|
| JP | 2007180648 A | 7/2007 |
| JP | 2009159685 A | 7/2009 |
| WO | 2010031428 A1 | 3/2010 |
| WO | 2010150317 A1 | 12/2010 |
| WO | WO2010150316 A1 | 12/2010 |

OTHER PUBLICATIONS

"LEDs in Glass Co.", http://www.ledsinglass.com.
"Light Points", Glass for Special Applications, Schott Glass Made of Ideas.
Shavit Daniel, "Capacitive Sensoric Intelligent LED Glass", www.glassfiles.com, Sep. 3, 2008, 1 page.

* cited by examiner

TRANSPARENT CAPACITIVE WIRELESS POWERING SYSTEM

This application claims priority from U.S. provisional application No. 61/523,925 and U.S. provisional application No. 61/523,951, both filed on Aug. 16, 2011 and U.S. provisional application No. 61/622,106 filed Apr. 10, 2012.

The invention generally relates to capacitive powering systems for wireless power transfers, and more particularly to wireless power transfers over large areas of infrastructure made of transparent non-conductive material.

Wireless power transfer refers to the supply of electrical power without any wires or contacts, thus the powering of electronic devices is performed through a wireless medium. One popular application for contactless powering is for the charging of portable electronic devices, e.g., mobiles phones, laptop computers, and the like.

One implementation for wireless power transfers is by an inductive powering system. In such a system, the electromagnetic inductance between a power source (transmitter) and the device (receiver) allows for contactless power transfers. Both the transmitter and receiver are fitted with electrical coils, and when brought into physical proximity, an electrical signal flows from the transmitter to the receiver.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of an inductance to resistance, be composed of materials with low resistance, and fabricated using a Litze-wire process to reduce skin-effect. Moreover, the coils should be designed to meet complicated geometries to avoid Eddy-currents. Therefore, expensive coils are required for efficient inductive powering systems. A design for contactless power transfer system for large areas would necessitate many expensive coils, thus for such applications an inductive powering system may not be feasible.

Capacitive coupling is another technique for transferring power wirelessly. This technique is predominantly utilized in data transfer and sensing applications. A car-radio antenna glued on the windshield with a pick-up element inside the car is an example of a capacitive coupling. This type of application can also be supported using indicative coupling. That is, current techniques that enable power transfer through glass either using capacitive coupling or indicative coupling are known. This is primarily utilized in automotive applications, in which either the windshield or the electronic devices are purposely designed to enable such power transfers.

For example, US Patent Application Publication No. 2010/0060077 discloses an automotive glazing having a non-galvanic contact for an electrical device associated with the glazing. The glazing includes a first ply and a second ply of transparent glazing material having a ply of interlayer material extending between the plies of glazing material. The automotive glazing is manufactured to include an electrical circuit, having a first connector that is designed to form a coupling region such that electrical signals in the circuit can be coupled between the coupling region and an electrical device placed on the outer surface glazing.

However, such glazing can be utilized to transfer power only in the coupling region which is a small and limited area in the glazing. Increasing the size of the coupling region to power a large area, would require increasing the coupling factor using, for example, a ferromagnetic core. However, such cores are expensive and are not applicable in capacitive power systems. Thus, the wireless power transfer system discussed in the related art cannot supply power over a large transparent area.

Therefore, it would be advantageous to provide a low cost and feasible solution for wireless powering of loads connected to transparent surfaces adopted over large areas.

Certain embodiments disclosed herein include a transparent capacitive powering system. The system comprises a pair of receiver electrodes connected to a load through an inductor, wherein the inductor is coupled to the load to resonate the system; and a transparent infrastructure having at least a first layer of a non-conductive transparent material and a second layer of a conductive transparent material coupled to each other, wherein the second layer is arranged to form a pair of transmitter electrodes, wherein the pair of receiver electrodes are decoupled from the second layer, thereby forming a capacitive impedance between the pair of transmitter electrodes and the pair of receiver electrodes, wherein a power signal generated by a driver is wirelessly transferred from the pair of transmitter electrodes to the pair of receiver electrodes to power the load when a frequency of the power signal substantially matches a series-resonance frequency of the first inductor and the capacitive impedance.

Certain embodiments disclosed herein also include a transparent capacitive powering system. The system comprises a pair of receiver electrodes connected to a lamp through an inductor, wherein the inductor is coupled to the load to resonate the system, each receiver electrode includes a top-layer made of transparent conductive material and a bottom-layer made of transparent non-conductive material; and a transparent infrastructure having at least a first layer of a non-conductive transparent material and a second layer of a conductive transparent material coupled to each other, wherein the second layer is arranged to form a pair of transmitter electrodes, the bottom-layers pair of receiver electrodes are in contact with the transparent infrastructure, the top-layers are in contact with lamp, the pair of receiver electrodes are decoupled from the second layer, thereby forming a capacitive impedance between the pair of transmitter electrodes and the pair of receiver electrodes, wherein a power signal generated by a driver is wirelessly transferred from the pair of transmitter electrodes to the pair of receiver electrodes to power the lamp when a frequency of the power signal substantially matches a series-resonance frequency of the inductor and the capacitive impedance.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
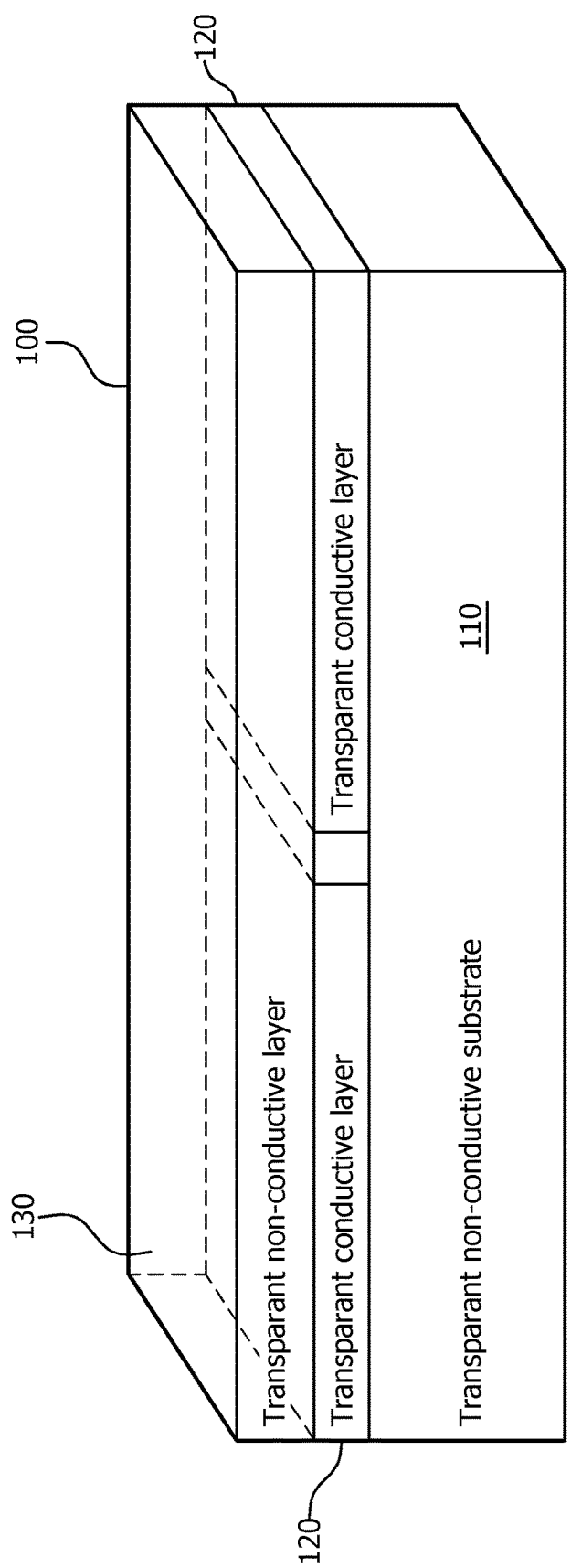
FIG. 1 is a diagram of an infrastructure constructed to enable capacitive coupling.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The capacitive wireless powering system constructed according to various embodiments enables power transmissions over a large area. The disclosed system can be installed in places where open electrical contacts are not preferred or are not desirable, such as bathrooms, retail-shops where regular variations are needed to illuminate a product, furniture, and the like. The capacitive wireless powering system can transfer power over a large area of a brittle transparent solid infrastructure, such as but not limited to windows, mirrors, glass flooring, or any other infrastructure made of glass.

FIG. 1 shows an exemplary diagram of a transparent infrastructure 100 constructed to enable capacitive coupling. The infrastructure 100 is a "sandwich-like" pattern including a bottom transparent non-conductive substrate 110, a middle transparent conductive layer 120, and a top transparent non-conductive layer 130. In one embodiment, the layers 120 and 130 are thin layers of material, e.g., the thickness of the layers 120 and 130 is typically between 10 microns (e.g., a paint layer) and a few millimeters (e.g., a glass layer).

The transparent conductive layer 120 may be made of conductive material including, for example, aluminum, indium tin oxide (ITO), organic material, such as PEDOT, or any other transparent conductive material. For example, the conductive layer 120 can be a foil that is glued onto the top non-conductive layer 130.

The transparent bottom and top non-conductive layers 110 and 130 are substrate that can be of transparent insulating material including, for example, glass, fiberglass, polycarbonate, and the like. In an embodiment, a material with dielectric permittivity is selected. In one embodiment, the bottom non-conductive layer is optional and is used to strengthen the infrastructure 100.

As shown in FIG. 1, at least two electrically isolated areas are formed inside the middle conductive layer 120, to create at least one pair of transmitter electrodes. As is discussed in detail below, a power driver (not shown in FIG. 1) is connected to the transparent conductive layer 120. Such connection may be a galvanic or non-galvanic connection.

Figure 2:
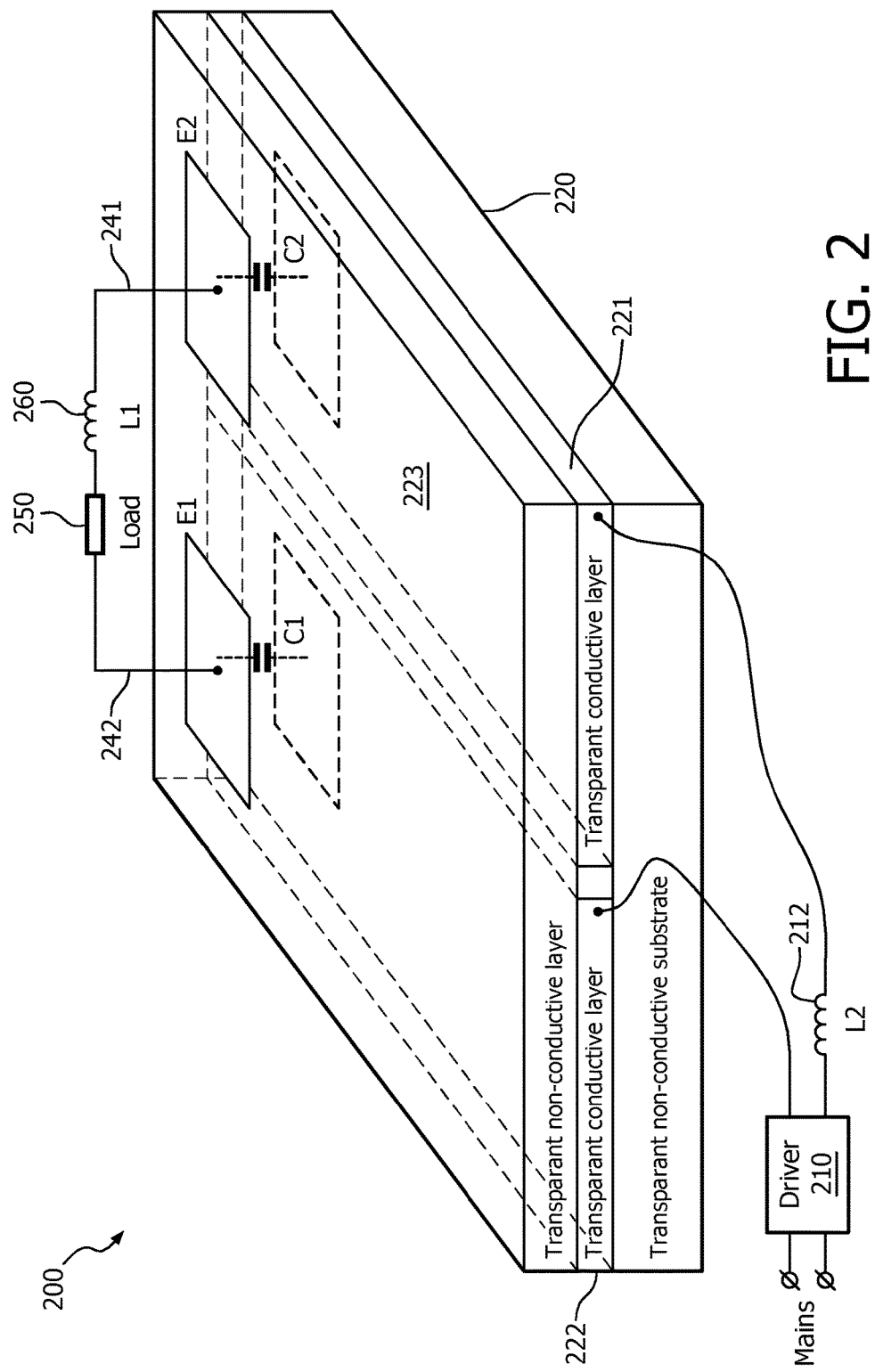
FIG. 2 is a schematic diagram of a transparent capacitive wireless powering system constructed according to one embodiment.

FIG. 2 shows a schematic diagram of a transparent capacitive wireless powering system constructed according to one embodiment. The system 200 includes a driver 210, an infrastructure 220, a pair of receiver electrodes 241 and 242 connected to a load 250 and an inductor 260. Optionally, the system 200 may include an inductor 212 coupled to the driver 210. The infrastructure 220 is constructed as described in detail above to include bottom and top transparent non-conductive layers, and in between, a transparent conductive layer. The conductive layer is arranged in such a way to form a pair of transmitter electrodes 221 and 222 which are attached to the top non-conductive layer 223. The transmitter electrodes 221, 222 can be in any shape including, for example, a rectangle, a circle, a square, or combinations thereof. In the embodiment illustrated in FIG. 2, the connection between the transmitter electrodes 221, 222 to the driver 210 is by means of a galvanic contact.

The receiver electrodes 241, 242 can be of the same conductive material as the middle conductive layer 221 or 222. The conductive material of each of the receiver electrodes may be, for example, carbon, aluminum, indium tin oxide (ITO), organic material, such as PEDOT (poly(3,4-ethylenedioxythiophene)), copper, silver, conducting paint, or any conductive material. The conductive material of the transmitter electrodes are transparent or semi-transparent and may be, for example, aluminum, indium tin oxide (ITO), organic material, such as PEDOT. All of these materials are transparent or semi-transparent, when deployed in very thin layers. For example, ITO is by its nature already transparent, for example more than 95% transparent, independent of the thickness of the electrodes. Aluminum, for example, is normally not transparent, but when deployed in a thickness of less than 50 micron, such material is semi-transparent, for example approximately about 50% transparent.

The total capacitance of the system 200 is formed by the overlap areas of respective transmitter and receiver electrodes 221, 241, and 222, 242, as well as the thickness and material properties of a top non-conductive layer 223. The capacitance of the system 200 is illustrated as C1 and C2 in FIG. 2. In order to allow electrical resonance, the system 200 should also include an inductive element, which is the inductor 260 and in some configurations the inductor 212.

A power is supplied to the load 250 by placing the receiver electrodes 241, 242 in proximity to the transmitter electrodes 221 and 222 without having a direct contact between the two. Thus, no mechanical connector or any electrical contact is required in order to power the load 250. The load 250 may be, but is not limited to, lighting elements (e.g., LED, LED string, a lamp, etc.), displays, computers, power charges, loudspeakers, digital photo frames, and the like.

The driver 210 outputs an AC voltage signal having a frequency substantially as the series-resonance frequency of a circuit consisting of a series of the capacitors (C1 and C2) and inductors 212, 260. The capacitors (C1 and C2) are the capacitive impedance of the transmitter electrodes 221, 222 and receiver electrodes 241,242 (shown in dotted lines in FIG. 2). In an embodiment the impedances of the capacitors and inductor 260 cancel each other at the resonance frequency, resulting in a low-ohmic circuit. Thus, the system 200 is capable of delivering power to the load 250 with very low power losses.

In an embodiment, the load 250 may further include electronics for controlling or programming various functions of the load 250 based on a control signal generated by the driver 210. To this end, in an embodiment, the driver 210 generates a control signal that is modulated on the AC power signal. For example, if the load 250 is an LED lamp, a control signal output by the driver 210 may be utilized for dimming or color setting of the LED lamp.

Another embodiment for dimming and/or color setting of a lamp acting as a load 250 includes misplacing the transmitter and receiver electrodes, i.e., when the respective electrodes 221/241 and 222/244 do not fully overlap each other. In such a case, the electrical circuit is out of resonance, thus less power is transferred from the driver 210 to the lamp (load 250).

Figure 3:
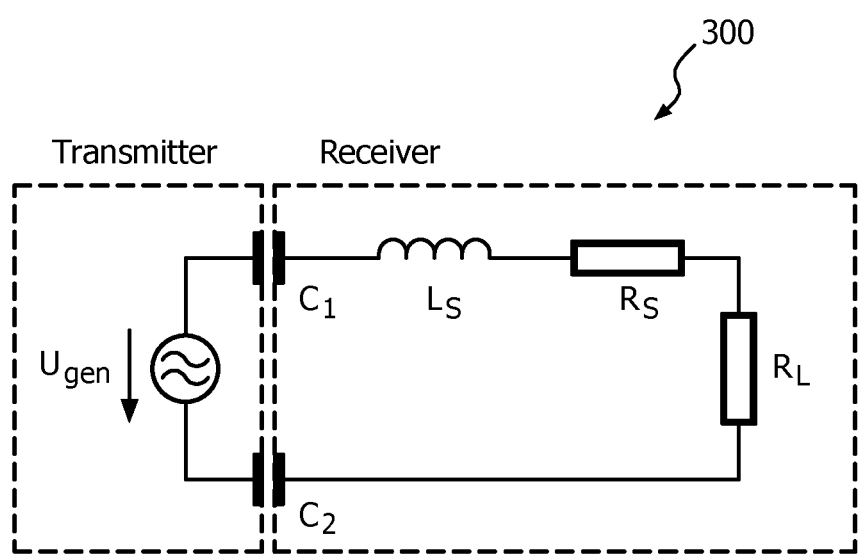
FIG. 3 is an electric diagram of a transparent capacitive wireless powering system.

An electric diagram 300 of the system 200 is provided in FIG. 3. The maximum power is obtained when the frequency of the power signal $U_{gen}$ is close to the series-resonance of the circuit comprised of the load $R_L$, the resistor $R_S$ (represents the inductor resistance), and capacitors $C_1$ and $C_2$ and inductor $L_S$. The series-resonance is determined by the values of the capacitors $C_1$ and $C_2$ and inductor $L_S$. The values of the capacitors $C_1$ and $C_2$ and inductor $L_S$ are selected such that they cancel each other at the operating frequency of the signal $U_{gen}$. Therefore, only the series resistance of the inductor $R_S$ and the connectivity of the electrodes limit the power transfer. It should be appreciated that this allows transferring AC signals characterized by high power with low frequency signals.

Figure 4:
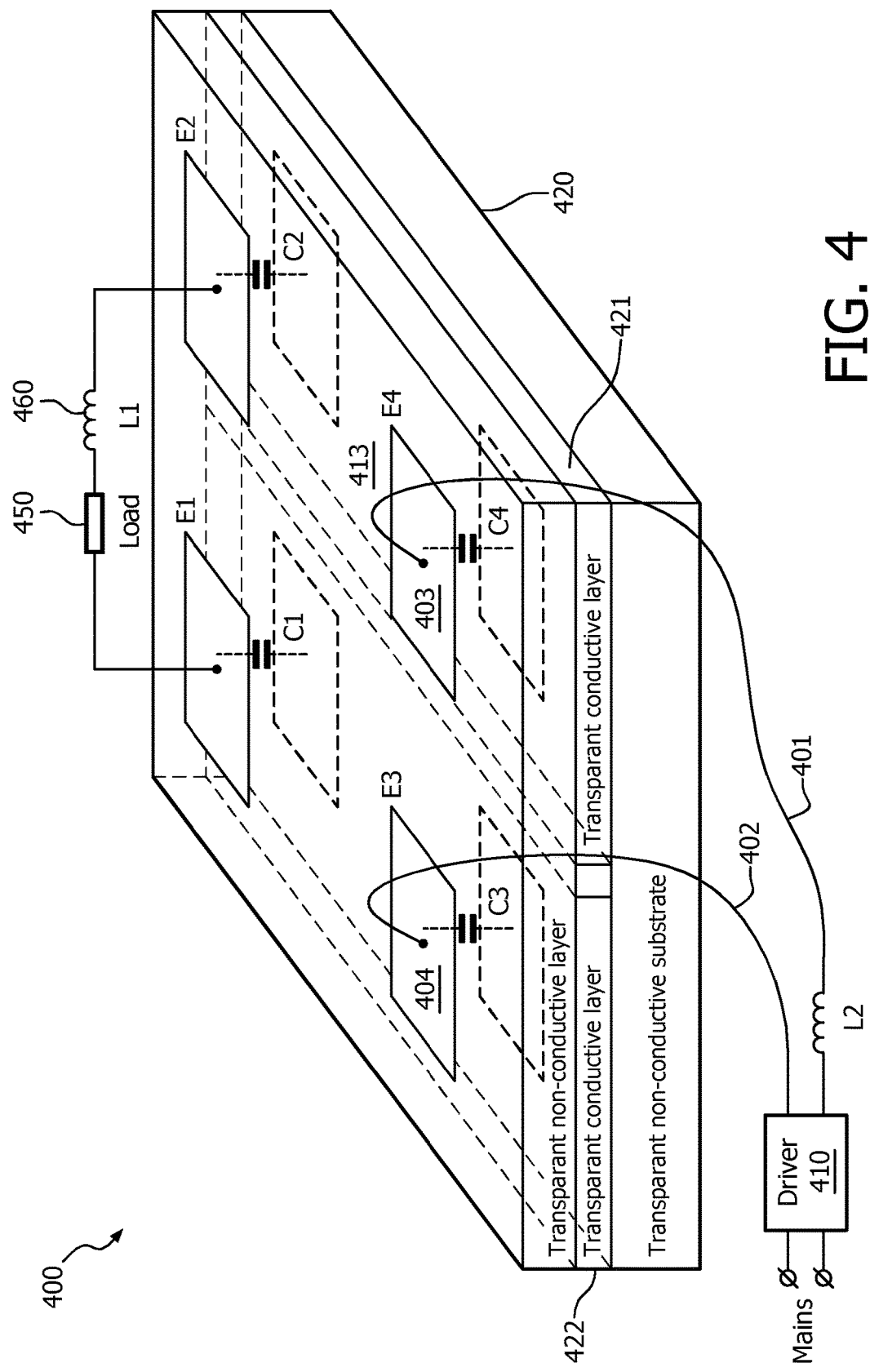
FIG. 4 is a diagram of a transparent capacitive wireless powering system where a power driver is connected to a non-galvanic connection constructed according to another embodiment.

FIG. 4 shows another arrangement of the transparent capacitive wireless powering system 400 constructed according to another embodiment. The system 400 includes similar elements to the powering system 200 illustrated in FIG. 2. In this embodiment, a capacitive coupling is applied between the driver 410 and the transmitter electrodes 421, 422, thus no wire connections are needed. This embodiment is advantageous in a modular infrastructure for easy extension of the infrastructure.

The wires 401 and 402 connect the driver 410 to coupling plates 403 and 404 respectively. The coupling plates 403, 404 are placed on a top non-conductive layer 413 of an infrastructure 400 to create capacitive impedance with transmitter electrodes 421, 422, shown as capacitors (C3 and C4). The infrastructure 400 is structured as the infrastructure 100 discussed in detail above. The plates 403, 404 can be placed anywhere on top of the infrastructure 400.

A power signal generated by the driver 410 is wirelessly transferred to the transmitter electrodes 421, 422 by means of the capacitive coupling formed between plates 403, 404 of these electrodes. The power signal travels along the conductive layer to power a load 450 connected to receiver electrodes 441, 442 through an inductor 460.

In an embodiment the, driver 410 outputs an AC voltage signal having a frequency substantially as the series-resonance frequency of a circuit consisting of a series of the capacitors (C1, C2 and C3, C4) and at least one of inductors 460 and 412. As mentioned above, the capacitors (C1 and C2) are the capacitive impedance of the transmitter electrodes 421, 422 and receiver electrodes 441, 442. The impedances of the capacitors and inductor 460 cancel each other at the resonance frequency, resulting in a low-ohmic circuit. Thus, the system 400 is capable of delivering power to the load 450 with very low power losses.

It should be noted that in the embodiments described in FIGS. 2 and 4, the capacitive powering systems 200 and 400 depict a single load (e.g., a load 250 or 450) that is powered by a driver (e.g., driver 210 or 410). However, according to the embodiments disclosed herein, the power driver can also power multiple loads; each load may be tuned to a different resonance frequency. In such a configuration, the frequency of a signal outputted by the driver (e.g., driver 210 or 410) determines which device is powered.

The driver may also generate an AC sweep signal (a signal with a varied frequency). When fast enough, the frequency sweep powers the devices during the period that the frequency of the AC signal coincides with respective load resonance tuning. In this way, several loads tuned at different frequencies can be powered in a multiplexed way. To fill the power-less gaps in between sweeps, batteries and/or capacitors can be added. In another embodiment, a spread spectrum powering of the load is provided. Accordingly, an AC power signal characterized by a large band of frequencies is generated by the driver, allowing each individual load in a group of multiple loads to be tuned within a range of different frequencies, therefore each individual load may be powered independently.

In the capacitive wireless powering system described with reference to FIGS. 2 and 4, there is no direct electric contact between the load and the infrastructure; the load is mounted to the infrastructure by mechanical means. In one embodiment, the load is adhered to a top non-conductive layer of the infrastructure.

In another embodiment, an electrical conductive fabric material (e.g., Velcro) is adhered to the infrastructure and another piece of the electrical conductive fabric material is glued to the load, thus the electrical conductive fabric material serves as the receiver electrodes.

Figure 5:
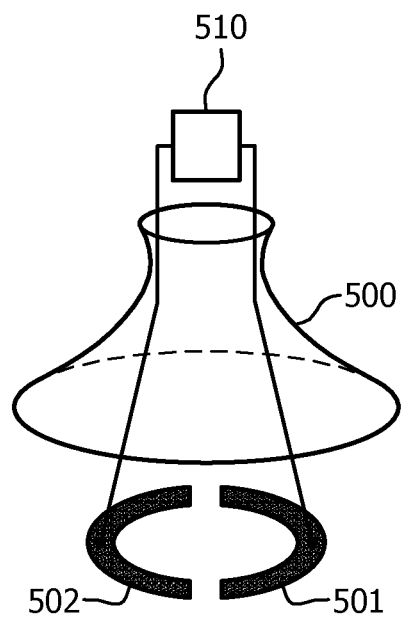
FIGS. 5, 6 and 7 are schematic diagrams of devices constructed to allow mechanical coupling between a load and an infrastructure of a transparent capacitive wireless powering system.
Figure 6:
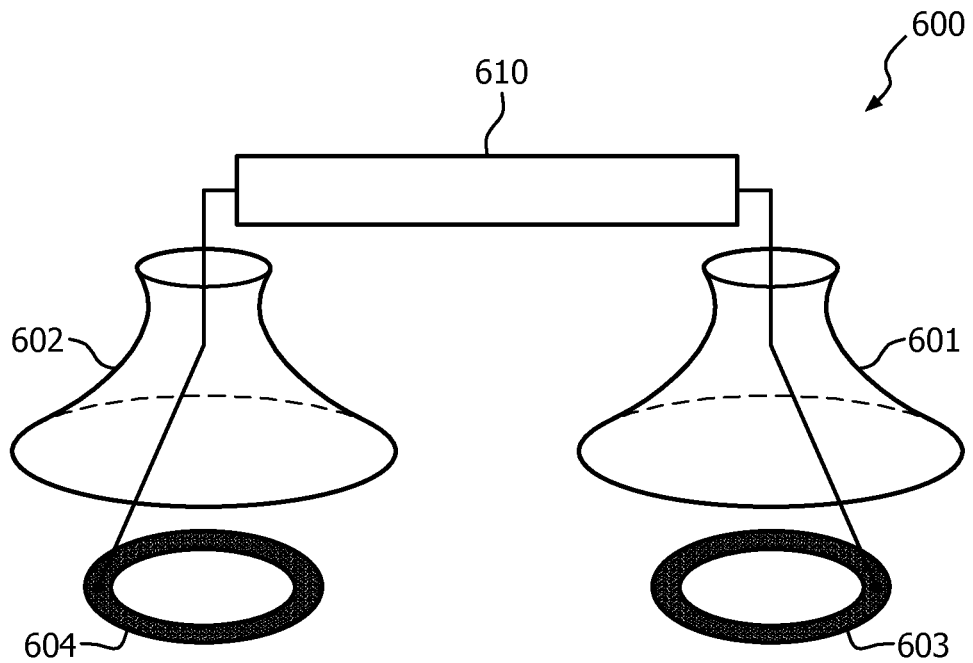
Figure 7:
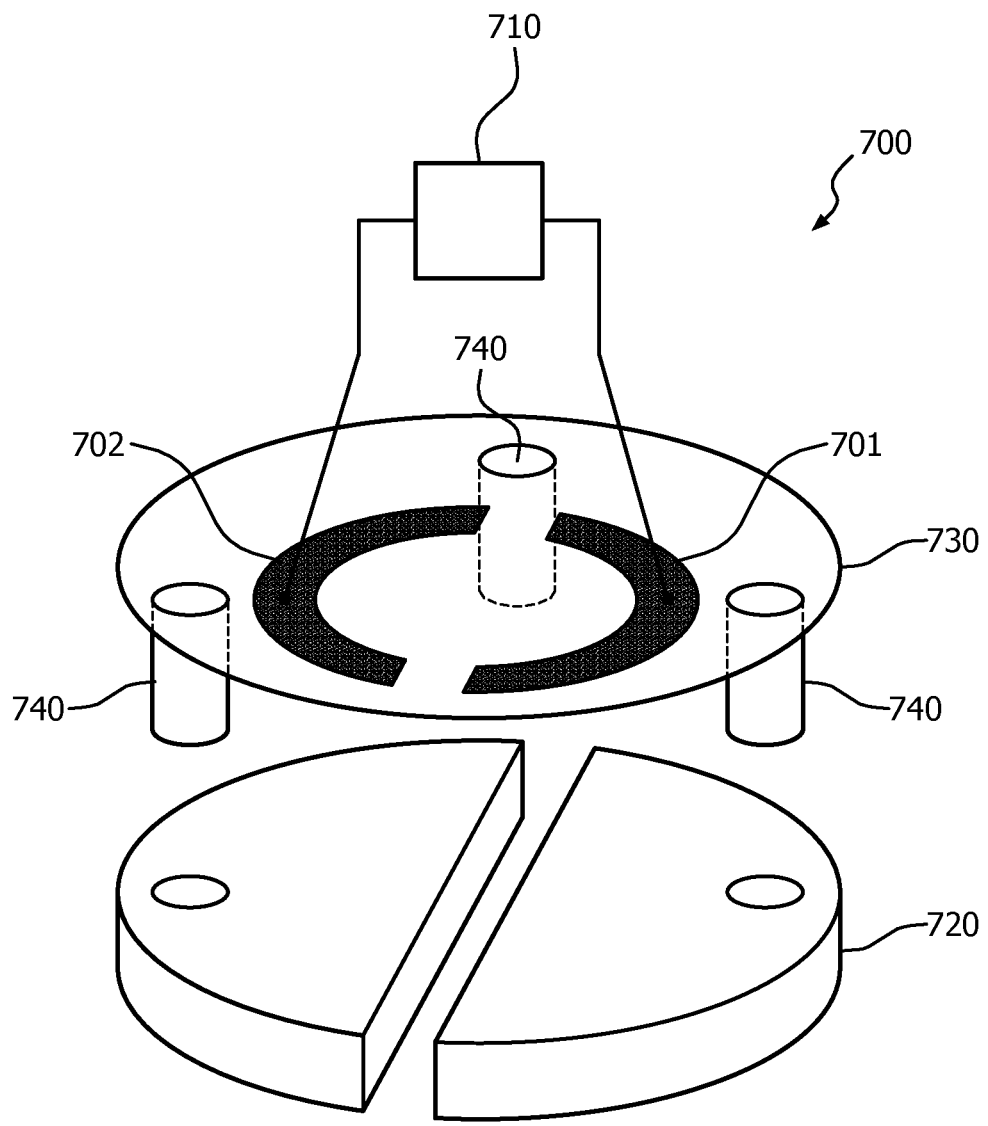

FIGS. 5, 6 and 7 show different types of devices constructed to allow mechanical coupling between the load on the infrastructure according to various embodiments of the invention.

FIG. 5 is a vacuum cup 500 designed for the purpose of allowing electrical connectivity between a pair of receiver electrodes 501 and 502 and a load 510. A vacuum cup (also known as a suction cup) is a tool utilized for window installation which does not allow movement over the surface while the vacuum is maintained. The receiver electrodes 501 and 502 are added to the vacuum cup 500 to allow power transfer from the transmitter electrodes to the load. The receiver electrodes 501, 502 are made from for example, any of the conductive material mentioned above. In one embodiment when the vacuum is maintained in the cup 500, the receiver electrodes 501 and 502 are in contact with the infrastructure. Thus, when placing the vacuum cup 500 in proximity to the transmitter electrodes within the infrastructure and the vacuum is maintained by the cup 500, then the load 510 is wirelessly powered as discussed in detail above.

FIG. 6 shows another device 600 that is based on two vacuum cups 601 and 602 with a load connected in between. The vacuum cup 601 includes a first receiver electrode 603 while the cup 602 includes a second receiver electrode 604. When a vacuum is maintained by both cups 601 and 602, the receiver electrodes 603 and 604 are in contact with the infrastructure. Thus, if placing the device 600 in proximity to the transmitter electrodes within the infrastructure and the vacuum is maintained by the cups 601 and 602, a capacitive coupling is created and a load 610 is wirelessly powered as discussed in detail above.

FIG. 7 shows another device constructed to allow mechanical coupling between a load 710 and the infrastructure (not shown, for example infrastructure 220 or 420) to allow electrical connectivity between a pair of receiver electrodes 701 and 702 and the load 710. The device 700 also includes a conductive foam 720 (or other conductive flexible material) that is adhered to the infrastructure. The receiver electrodes 701 and 702 are printed or formed in a non-conductive ring 730. The ring 730 is attached to the conductive foam 720 by means of one or more pins 740. The device 700 may be structured in any shape other than a ring.

Thus, when placing the device 700 in proximity to the transmitter electrodes within the infrastructure and the ring 730 is attached to the foam 720, a capacitive coupling is created and the load 710 is wirelessly powered as discussed in detail above. Although not specifically illustrated in FIGS. 5, 6 and 7, the load may be also connected to an inductor in order to resonate the circuit.

In another embodiment, the infrastructure utilized in the capacitive wireless systems may be insulated glazing (IG) also known as double glazing. Such glazing includes, for example, double or triple glass window panes separated by a spacer. The spacer is a piece of metal that separates the two panes of glass in an insulated glazing and seals the gas space between them. Typically, in such glazing the inner glass (for example, the glass inside a house or building) is coated with a conductive material. This coating layer blocks certain radiation from the sun coming from the outside of the house. In one embodiment, the coating layer is patterned to form two separate electrodes utilized as the transmitter electrodes. The power from the driver can be coupled to the coating layer by means of a galvanic connection (e.g., as shown in FIG. 2) or as a capacitive connection (e.g., as shown in FIG. 4).

The various embodiments for wireless power transfer over a large area of transparent infrastructure are utilized in numerous partial applications. For example, lamp armatures are placed on windows or mirrors. In the case of a mirror, the conductive layer is a non-transparent layer of silver. As another example, the teachings disclosed herein are utilized to power a lamp and/or pump installed inside an aquarium. As another example, an air-fan or a portable GPS car navigation system is placed on the windshield of a car to be wirelessly powered by the battery of the car. In certain embodiments these devices are mounted using the vacuum cups shown in FIGS. 5 and 6.

Figure 8:
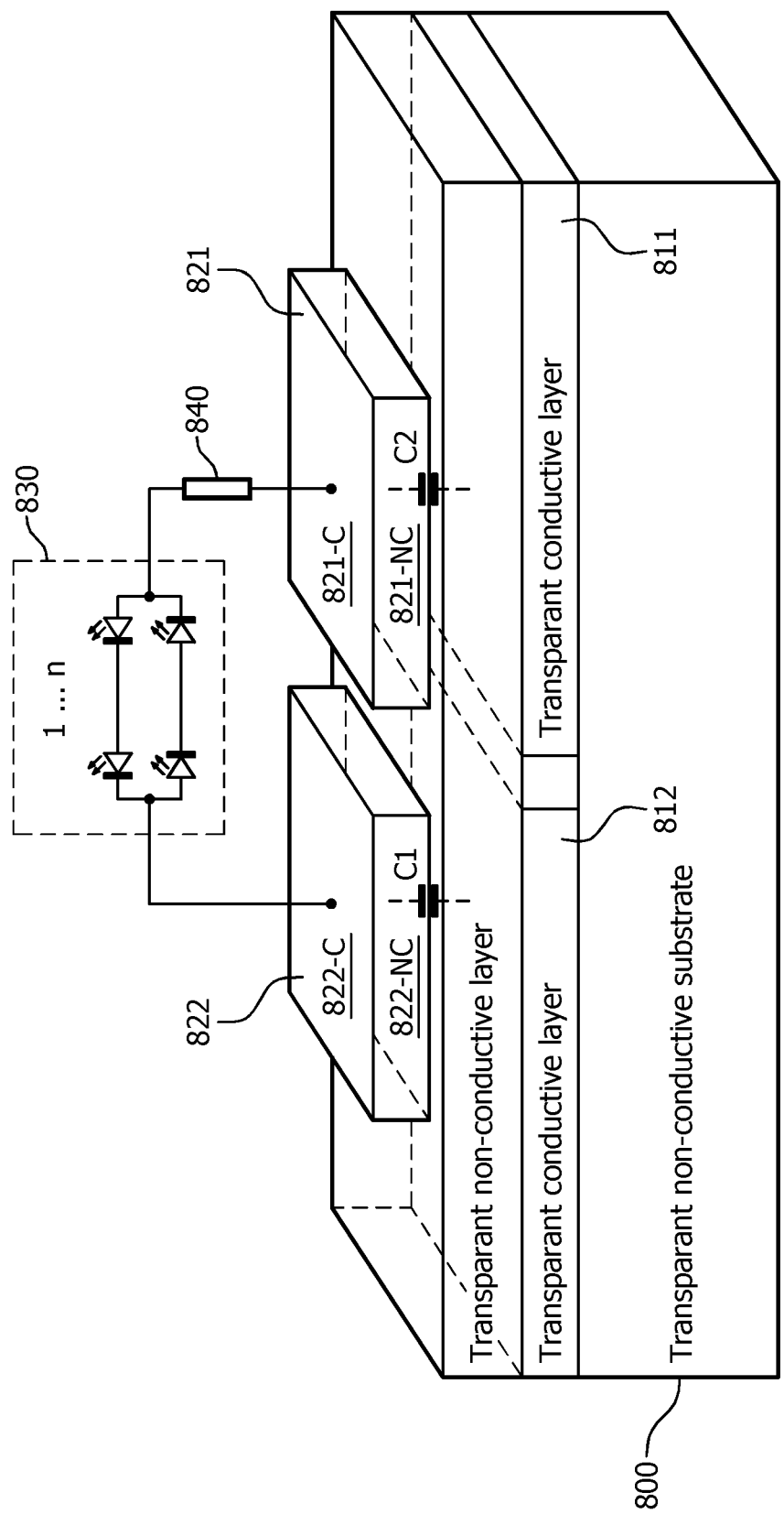
FIG. 8 is a schematic diagram illustrating an embodiment of a transparent lamp powered by the transparent capacitive wireless powering system.

In one embodiment, the transparent capacitive power system disclosed herein is utilized to power a lamp placed on top of the infrastructure. The lamp illuminates downwards through the infrastructure of the system. This embodiment is illustrated in FIG. 8. The lamp may be, for example, a LED lamp, a LED string, and the like. The infrastructure 800 is structured as the infrastructure 100 discussed in detail above and includes bottom and top transparent non-conductive layers with a conductive layer placed in-between. The middle conductive layer is structured to create a pair of transmitter electrodes 811, 812.

A lamp (i.e., a load) 830 is connected to a pair of receiver electrodes 821, 822. Each of the receiver electrodes 821, 822 includes a transparent conductive layer (821-C, 822-C) and receiver electrodes 821, 822 non-conductive layer (821-NC, and 822-NC).

The lamp 830 is placed in proximity to the transmitter electrodes 811, 812. When placed correctly, each of the receiver electrodes is arranged adjacent to one of the transmitter electrodes, such that adjacent electrodes form capacitors (shown C1 and C2).

An alternating voltage is applied to the transmitter electrodes, such that a current flows through the capacitors formed between the receiver and transmitter electrodes to the lamp 830. The impedances of the capacitors (C1 and C2) and inductor 840 cancel each other at the resonance frequency, resulting in a low-ohmic circuit. Thus, the system 800 is capable of delivering power to the load 830 with very low power losses.

As the receiver electrodes 821, 822 and the infrastructure 800 are transparent, the lamp 830 illuminates items placed under the infrastructure 800. The lamp 830 may be, for example a LED, a LED strings, a LED lamp, and the like.

Figure 9:
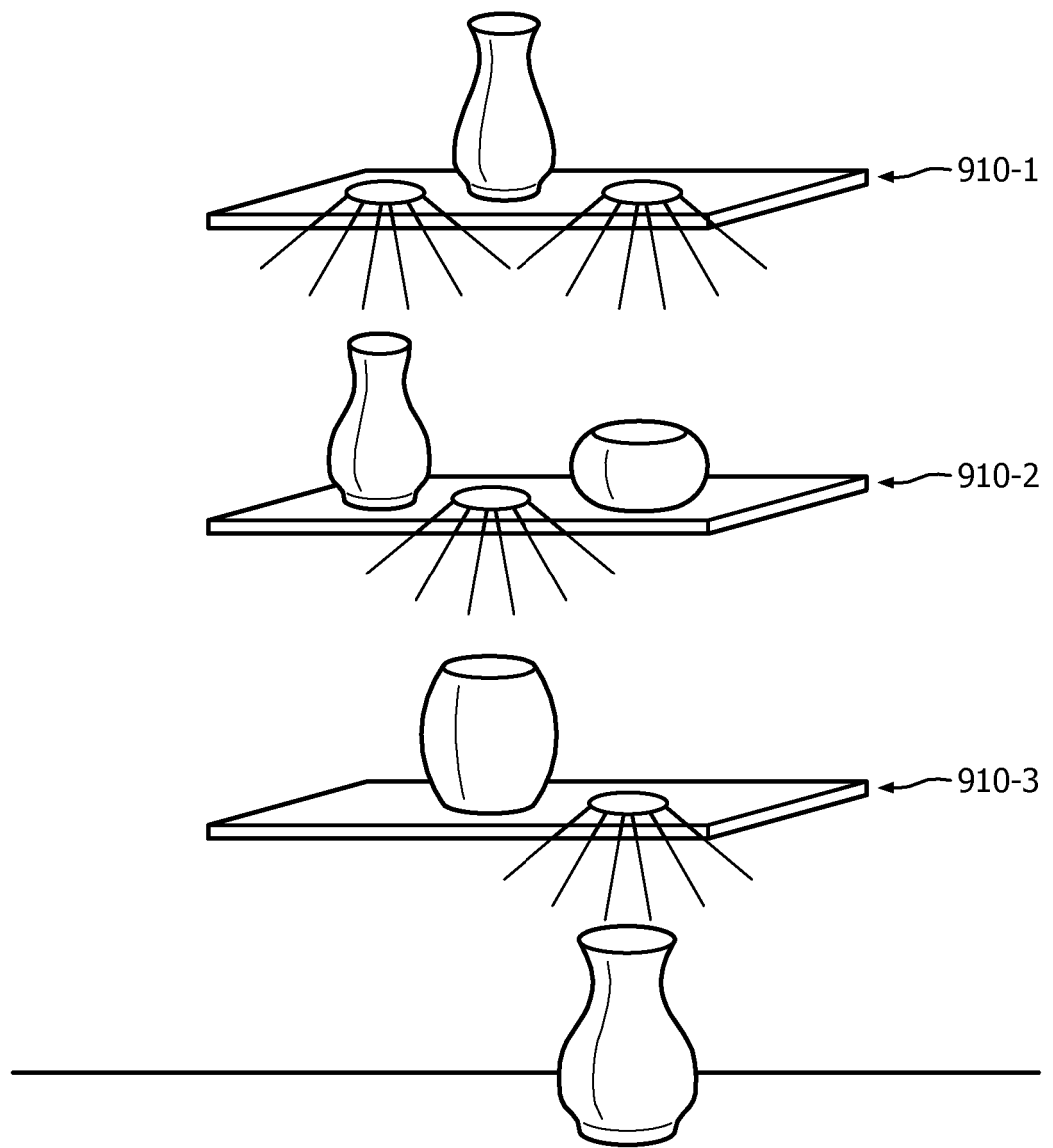
FIG. 9 is a schematic diagram of an example partial application of showcases illuminated using the transparent lamp powered by the transparent capacitive wireless powering system.

As a partial application, the system shown in FIG. 8 can be utilized in shops where glass showcases are used to display items. In one embodiment the infrastructure 800 is used as shelves where the lamp 830 and its receiver 811, 812 electrodes are placed above to illuminate the items placed under the shelves. An exemplary diagram depicting such embodiment is illustrated in FIG. 9.

Each of the glass shelves 910-1, 910-2, and 910-3 are constructed as an infrastructure 800 to allow capacitive power transfer over the glass shelves. The transparent receiver electrodes and LED lamp are embedded in transparent pucks "P1", "P2", "P3" and "P4". Each LED lamp shines through a glass shelf to illuminate the articles placed under the glass shelves, as discussed above. In one embodiment the transparent pucks P1", "P2", "P3" and "P4" are not adhered or fixed to the glass shelves, but are simply placed on the shelves, thus allowing changes in positioning. It should be noted to that the transparent pucks P1", "P2", "P3" and "P4" can be fixed to the bottom transparent layer of a glass shelf to shine upward. In another embodiment, the transparent pucks P1", "P2", "P3" and "P4" are placed upside down on top of the shelves to shin upward. To compensate for the distance difference between the receiver and the transmitter electrodes the frequency of the power signal is increased or decreased depending on the distance difference. That is, for a larger distance a lower frequency is utilized for the power signal.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A transparent capacitive powering system comprising:
    a pair of receiver electrodes connected to a load through an inductor wherein the inductor is coupled in series with the load;
    a pair of coupling plates configured to receive a power signal generated by a driver;
    a transparent infrastructure having at least a first layer of a non-conductive transparent material and a second layer of a conductive transparent material coupled to each other,
    wherein the second layer is arranged to form a pair of transmitter electrodes,
    wherein the pair of coupling plates are decoupled from the second layer, thereby forming a first capacitive impedance between the pair of transmitter electrodes and the pair of coupling plates,
    wherein the pair of receiver electrodes are decoupled from the second layer, thereby forming a second capacitive impedance between the pair of transmitter electrodes and the pair of receiver electrodes,
    wherein the power signal is wirelessly transferred from the pair of coupling plates to the pair of transmitter electrodes and from the pair of transmitter electrodes to the pair of receiver electrodes to power the load when a frequency of the power signal substantially matches a series-resonance frequency of the inductor, the first capacitive impedance, and the second capacitive impedance.

2. The system of claim 1, wherein the transparent infrastructure further includes a third layer of non-conductive material coupled to the second layer.

3. The system of claim 2, wherein the transparent non-conductive material of each of the third layer and first layer is at least any one of: glass, fiberglass, and polycarbonate.

4. The system of claim 2, wherein the transparent infrastructure is an insulated glazing.

5. The system of claim 1, wherein the transparent conductive material of the second layer is at least any one of: an aluminum layer with thickness less than about 50 microns, indium tin oxide (ITO), and PEDOT.

6. The system of claim 1, wherein the driver is connected to the transmitter electrodes by means of any one of a capacitive coupling and a galvanic contact.

7. The system of claim 6, wherein the driver is connected to the transmitter electrodes by means of the capacitive coupling, the series-resonance frequency also includes capacitive impedance formed between the pair of transmitter electrodes and the driver.

8. The system of claim 1, wherein the load and the receiver electrodes are connected to the first layer of the transparent infrastructure by means of any one of: electrical conductive glue material, an electrical conductive fabric material, and a mechanical device.

9. The system of claim 8, wherein the mechanical device is a vacuum cup, wherein the vacuum cap includes the receiver electrodes, wherein the receiver electrodes are in contact with the first layer of the transparent infrastructure when vacuum is maintained in the vacuum cup.

10. The system of claim 8, wherein the mechanical device includes a non-conductive structure adhered to conductive flexible material, wherein the non-conductive structure includes the receiver electrodes and the conductive flexible material is in contact with the first layer of the of the transparent infrastructure.

11. The system of claim 1, wherein the load is at least a lamp, wherein the lamp is at least one of a LED string and a LED lamp.

12. The system of claim 11, wherein the system is configured to wirelessly power the lamp placed on top of the transparent infrastructure where the lamp illuminates downwards through the transparent infrastructure.

13. The system of claim 12, wherein each receiver electrode includes a top-layer made of transparent conductive material and a bottom-layer made of transparent non-conductive material, wherein the bottom-layer is in contact with the transparent infrastructure and the top-layer is in contact with the lamp.

14. A transparent capacitive powering system, comprising:
a pair of receiver electrodes connected to a lamp through an inductor wherein the inductor is coupled in series with the lamp, each receiver electrode includes a top-layer made of transparent conductive material and a bottom-layer made of transparent non-conductive material; and
a pair of coupling plates configured to receive a power signal generated by a driver;
a transparent infrastructure having at least a first layer of a non-conductive transparent material and a second layer of a conductive transparent material coupled to each other,
wherein the second layer is arranged to form a pair of transmitter electrodes, the bottom-layers of the pair of receiver electrodes are in contact with the transparent infrastructure, the top-layers are in contact with the lamp, the pair of receiver electrodes are decoupled from the second layer, thereby forming a second capacitive impedance between the pair of transmitter electrodes and the pair of receiver electrodes,
wherein the pair of coupling plates are decoupled from the second layer, thereby forming a first capacitive impedance between the pair of transmitter electrodes and the pair of coupling plates,
wherein the power signal is wirelessly transferred from the pair of coupling plates to the pair of transmitter electrodes and from the pair of transmitter electrodes to the pair of receiver electrodes to power the lamp when a frequency of the power signal substantially matches a series-resonance frequency of the inductor, the first capacitive impedance, and the second capacitive impedance.

15. The system of claim 14, wherein the system is configured to wirelessly power the lamp placed on top of the transparent infrastructure where the lamp illuminates downwards through the transparent infrastructure.

* * * * *